United States Patent [19]
Smith, III

[11] Patent Number: 5,146,585
[45] Date of Patent: Sep. 8, 1992

[54] SYNCHRONIZED FAULT TOLERANT CLOCKS FOR MULTIPROCESSOR SYSTEMS

[75] Inventor: Thomas B. Smith, III, Wilton, Conn.

[73] Assignee: International Business Machines Corporation, Armonk, N.Y.

[21] Appl. No.: 610,336

[22] Filed: Nov. 5, 1990

Related U.S. Application Data

[63] Continuation of Ser. No. 519,301, May 8, 1990, abandoned, which is a continuation of Ser. No. 262,416, Oct. 25, 1988, abandoned.

[51] Int. Cl.$^5$ .............. G06F 1/12; G06F 1/04; G06F 11/00
[52] U.S. Cl. .................. 395/550; 364/934; 364/945.9; 364/950.3; 364/DIG. 2; 371/61; 307/269; 375/108; 370/100.1; 340/825.14
[58] Field of Search ... 364/200 MS File, 900 MS File; 371/61; 307/269; 375/107, 108; 395/550, 650; 370/100.1; 340/825.14

[56] References Cited

U.S. PATENT DOCUMENTS

| | | | |
|---|---|---|---|
| 3,932,847 | 1/1976 | Smith | 364/200 |
| 4,021,784 | 5/1977 | Kimlinger | 375/108 |
| 4,063,078 | 12/1977 | Das Gupta et al. | 364/200 |
| 4,239,982 | 12/1980 | Smith et al. | 307/219 |
| 4,253,144 | 2/1981 | Bellamy et al. | 364/200 |
| 4,282,493 | 8/1981 | Moreau | 375/108 |
| 4,388,688 | 6/1983 | Curlee et al. | 364/200 |
| 4,405,899 | 9/1983 | Flemming | 328/72 |
| 4,412,342 | 10/1983 | Khan et al. | 375/108 |
| 4,413,318 | 11/1983 | Herrington | 364/200 |
| 4,497,022 | 1/1985 | Cormier et al. | 364/200 |
| 4,503,490 | 3/1985 | Thompson | 364/200 |
| 4,554,659 | 11/1985 | Blood et al. | 370/88 |
| 4,569,017 | 2/1986 | Renner et al. | 364/200 |
| 4,575,848 | 3/1986 | Moore et al. | 371/61 |
| 4,577,272 | 3/1986 | Ballew et al. | 364/200 |
| 4,584,643 | 4/1986 | Halpern et al. | 364/200 |
| 4,589,066 | 5/1986 | Lam et al. | 364/200 |
| 4,639,864 | 1/1987 | Katzman et al. | 364/200 |
| 4,644,498 | 2/1987 | Bedard et al. | 364/900 |
| 4,667,328 | 5/1987 | Imran | 371/61 |
| 4,709,347 | 11/1987 | Kirk | 364/900 |
| 4,779,008 | 10/1988 | Kessels | 307/269 |
| 4,780,892 | 10/1988 | Lagadec | 375/108 |
| 4,803,708 | 2/1989 | Momose | 377/28 |
| 4,839,907 | 6/1989 | Saneski | 375/113 |
| 4,864,574 | 9/1989 | Pritt | 371/61 |
| 5,041,798 | 8/1991 | Moorman et al. | 331/1 A |
| 5,041,966 | 8/1991 | Nakai et al. | 395/550 |

OTHER PUBLICATIONS

IBM Technical Disclosure Bulletin vol. 19, No. 8 Jan. 1977, Slave Clock Synchronization (pp. 3224, 3225).
T. Basil Smith "Fault Tolerant Clocking System" 1981 IEEE pp. 262-264 Cat. No. 81 CH1600-6.
Davies et al "Synchronization and Matching in Redundant Systems" 1978 IEEE pp. 531-539.

Primary Examiner—Michael R. Fleming
Assistant Examiner—Gopal C. Ray
Attorney, Agent, or Firm—Ratner & Prestia

[57] ABSTRACT

A system for providing fault-tolerant synchronized operation of the Time of Day (TOD) clocks of the respective data processors in a multiprocessor complex. Basically, the system is comprised of a duplex implementation having redundant TOD clock sources, and a plurality of TOD slaves which provide the TOD clocks in the associated processors. A register/counter in each TOD clock source is incremented by a high frequency signal to achieve the required TOD value resolution, and the latter signal is divided down to provide a lower reference frequency signal for synchronization of the clock sources. Each TOD slave includes terminals for receiving a pair of reference frequency signals and for trouble-free switching between the signals, as required. Alternatively, a quad implementation of clock sources which is substantially free of single points of failure of the synchronization mechanism is described. Frequency steering of the clock sources provides increased accuracy and conformity to real time when desired.

21 Claims, 6 Drawing Sheets

SYNCHRONIZED FAULT TOLERANT CLOCKS FOR MULTIPROCESSOR SYSTEMS

This application is a continuation of application Ser. No. 07/519,301 filed May 8, 1990, abandoned which is a continuation of Ser. No. 07/262,416, filed Oct. 25, 1988, abandoned.

BACKGROUND OF THE INVENTION

A significant aspect of operating a plurality of data processors in a multiprocessor system complex is the synchronization of the individual clocks associated therewith. For example, it is desirable and in fact, frequently necessary that the separate Time of Day (TOD) clocks of the coupled processors be synchronized if these processors are sharing Direct Access Storage Devices (DASD), the data contained upon DASD and other resources, or the processors are exchanging messages. Concomitant with the need for synchronization is that the synchronizing mechanism be fault tolerant. That is, single points of failure in the mechanism itself should be tolerated, such that loss of synchronization in the entire system complex will not occur.

Considerable effort has been directed by the computer industry to the design of fault-tolerant clock systems. Many of these designs have relied upon primary/secondary configurations of clocks. These systems typically have difficulty in detecting failures on the primary and when problems are detected they cannot easily switch from the primary to the secondary. Attempts to address these problems have been both expensive and unsatisfactory. The root cause of these problems is that the required resolution of the clock is typically smaller than the skew between the primary and secondary clock.

What is needed is an economical hardware means for providing synchronized operation of arbitrarily high separate resolution TOD clocks in the processors in a system complex. Moreover, since the complex represents a valuable resource and the individual processors exhibit intrinsic isolation of failures to single machines, it is necessary that the chosen clock synchronization mechanism not behave as a coupled or common failure mechanism, whereby a single point of failure therein could bring the entire complex down. The synchronization mechanism of the present invention fills such a need.

SUMMARY OF THE INVENTION

In accordance with the present invention there is provided a fault tolerant synchronization mechanism comprised basically of dual redundant TOD clock synchronization sources, and a plurality of TOD slaves which serve as the TOD clocks in the respective processors of the system complex. Each of the redundant TOD clock sources distributes a TOD synchronization signal to each one of the TOD slaves. Thus, each slave receives two synchronization signals. The TOD slaves include means for selecting a valid TOD signal from between the two signals and the slave uses such signal to maintain synchronization within the complex.

More specifically, the present invention provides an economical means of maintaining synchronism between the two sides of the duplexed TOD clock reference sources. The reference frequency signals, as well as other various status and data bits generated within one side of the TOD sources are encoded and transmitted to the other side of the TOD sources, and vice versa. In a given side, the phase of the incoming reference frequency signal is compared to the phase of the reference signal generated within the given side. A difference in phase between the signals results in a phase error signal which, after suitable processing, is used to vary the given side's reference frequency in a direction to drive the perceived phase error toward zero.

The present invention also provides an economical means of receiving a duplexed TOD time reference, and for trouble-free switching from one side of the TOD clock sources to the other side, when required for failure accommodation or operational convenience. Accordingly, each TOD slave receives two reference frequency signals from the respective sides of the TOD clock sources, and selects one of them. The selected signal drives a phase locked-loop in the TOD slave. Error detection means associated with the slave, monitor the incoming reference frequency signal. If a failure is detected, the slave is switched to the other incoming reference signal. In the event that frequency and phase lock cannot be maintained with either incoming signal, or both incoming signals have failed, a synchronization exception is raised in the associated processor.

While the fault coverage provided by the duplex system is adequate for most applications, the present invention contemplates a quad system implementation for near perfect coverage of all single points of failure of the synchronization mechanism. This last implementation is compatible with the duplex distribution of reference frequency signals to each TOD slave as described hereinbefore.

Finally, although either the dual or quad implementations will produce synchronized TOD clocks of acceptable accuracy for many situations, better conformity to real time may be achieved in accordance with the present invention by frequency steering elements within the TOD clock sources. This procedure involves correction of the generated reference frequency signal by summing predetermined numbers of cycles of the latter signal and comparing the result to a more precise time standard.

DESCRIPTION OF THE PREFERRED EMBODIMENTS

Figure 1:
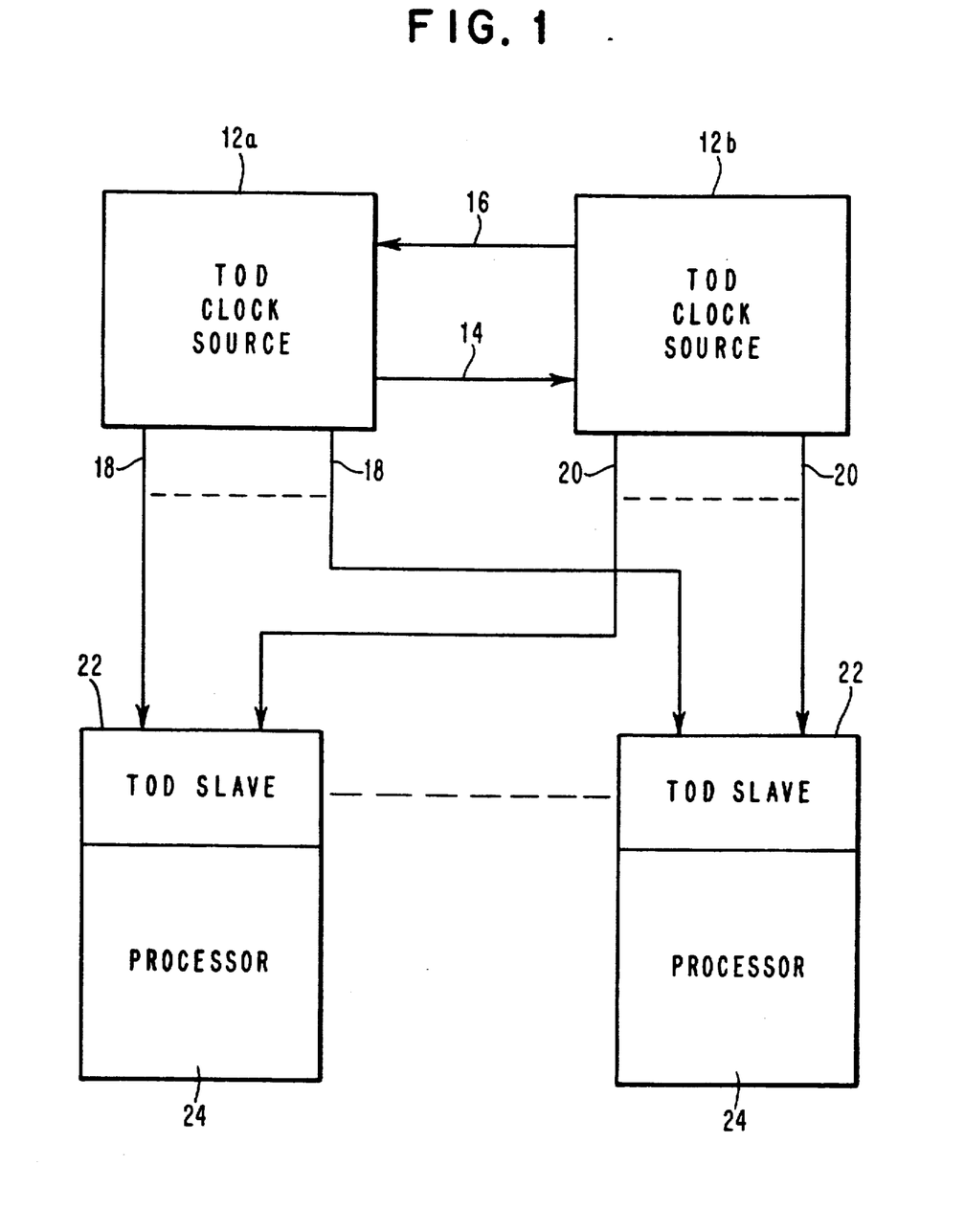
FIG. 1 is a block diagram of the overall dual TOD synchronization system implementation in accordance with the present invention.

With reference to FIG. 1, there is shown a dual TOD synchronization system 10 comprised of a pair of identical TOD clock sources 12a and 12b, each of which generates a reference frequency signal. The sources are coupled to each other such that the reference frequency generated by one is transmitted to the other. Thus, the signal generated by source 12a is applied to source 12b via link 14, while the signal from source 12b is coupled to source 12a by link 16. Additionally, the sources 12a and 12b provide respective pluralities of synchronization signals on lines 18 and 20. A pair of reference frequency signals, one from each of lines 18 and 20 are transmitted to a common TOD slave 22 associated with one of the processors 24 of the system complex. The TOD slaves 22 serve as the TOD clocks in the complex. The TOD sources 12a and 12b and the TOD slaves 22 may be coupled to one another by means of dedicated links, as in a dual star configuration, or by a dual redundant bus structure. As will be described in detail hereinafter, each of the TOD slaves 22 selects one reference frequency signal from the pair of signals transmitted to it by the TOD sources 12a and 12b, and uses such signal to maintain synchronization within the complex. The reference frequency signal is a low enough frequency so that any skews between the two clock sources are small with respect to one period of the reference frequency.

Figure 2:
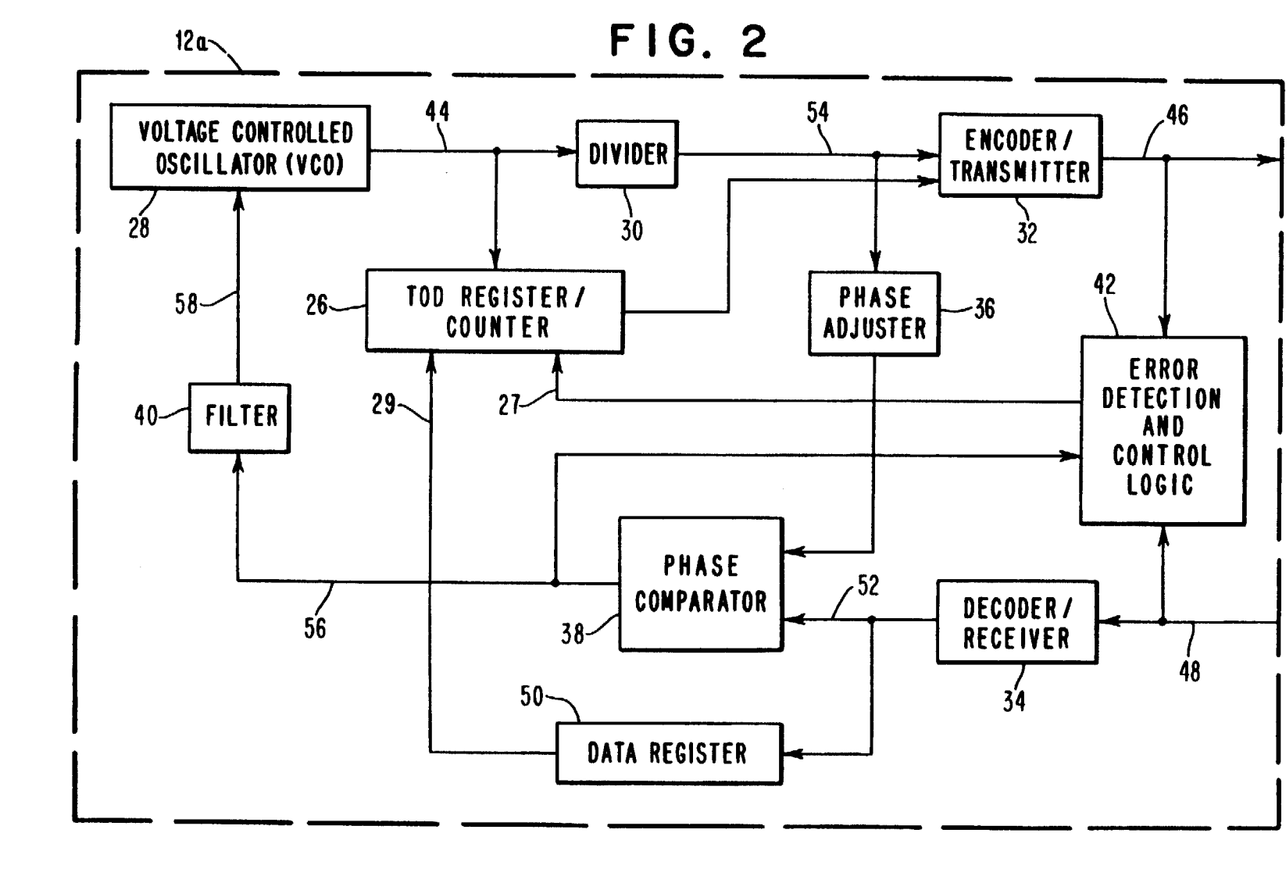
FIG. 2 illustrates the common internal organization of either side of the dual redundant TOD clock sources.

FIG. 2 provides details of the internal organization of the elements of which TOD clock source 12a of FIG. 1 is comprised. It should be understood that TOD clock source 12b consists of like elements.

Before describing the operation of the TOD source 12a, a brief explanation of each of the elements present therein and its function is given. A TOD register/counter 26 is provided which represents a facsimile of the standard format TOD clock utilized by the particular processors in the complex, and as such, it has the same bit resolution as the latter. For purposes of example, a 64 bit TOD register formal compatible with the IBM s/370 TOD will be assumed. The bits of the TOD are numbered from 0 to 63. Bit 0 is the most significant bit and bit 63 is the least. The register is a binary counter and is incremented at a rate which causes bit 31 of the register to toggle every $2^{20}$ microsound (approximately 1.04 seconds). This is called a mega-micro-second or MuS period.

Figure 4:
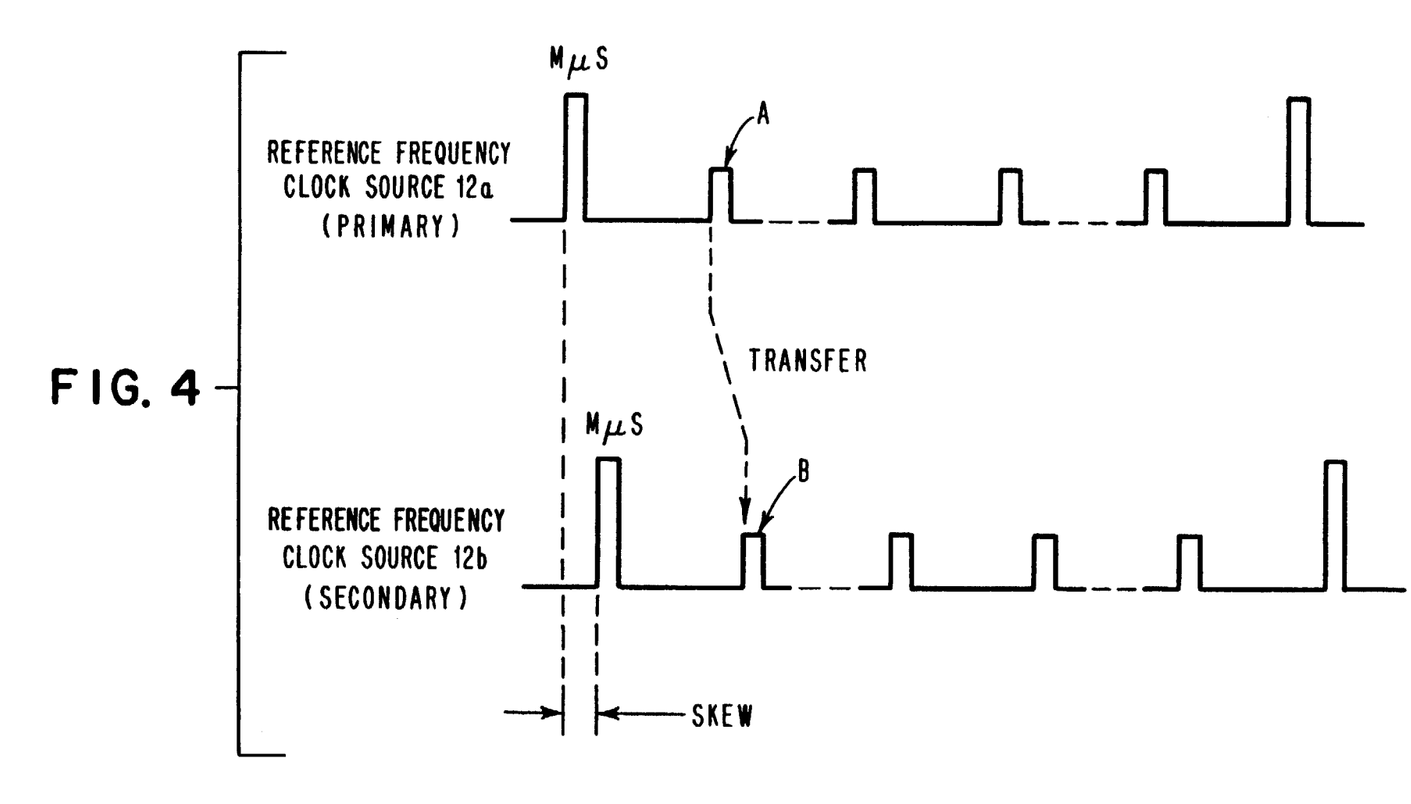
FIG. 4 is a timing diagram illustrating the relationship of the reference frequency signals generated respectively by the dual clock sources.

A voltage controlled oscillator (VCO) 28 generates the internal clock for the TOD source 12a. This internal clock is used to increment the TOD register/counter 26 and is also divided down in divider 30 to produce the TOD reference frequency for TOD source 12a. As seen in FIG. 4, the period of the reference frequency is selected to be larger than any skews which may appear between sources 12a and 12b due to normal variations in component characteristics. The reference frequency is used as a carrier for the data. It should be noted that the actual resolution of the counter (the inherent VCO internal clock frequency) can be arbitrarily high with respect to this reference frequency.

An encoder/transmitter 32 is provided for encoding and transmitting the TOD source 12a reference frequency, together with other status and data bits.

A decoder/receiver 34 is provided for receiving and decoding the reference frequency and transmitted data from the other TOD source 12b(FIG. 1).

Also included in TOD source 12a are phase adjuster 36, phase comparator 38 and filter 40 circuits, and miscellaneous error detection and associated control elements 42.

In operation, the VCO 28 provides an internal clock output signal on line 44 which is used to increment the TOD register/counter 26. The signal from the VCO 28 is also applied to divider 30, where it is divided down to produce a reference frequency signal. A synchronization point signal or "syncpoint" (the MuS syncpoint in this embodiment) is derived from the count in the TOD register/counter 26, as indicated hereinbefore. The reference frequency, syncpoint, and TOD register/counter 26 data and various status indicators are encoded and transmitted by encoder/transmitter 32 to TOD source 12b (FIG. 1) via line 46. As indicated in FIG. 1, all of the last mentioned information is transmitted as well to all of the TOD slave units 22 within the complex. While various methods of encoding are well known, the present invention contemplates the use of bi-phase encoding of the data and syncpoint at the reference frequency, with suitable sync, framing and idle symbols. The data transmission includes the value of bits 0.31 (high order bits) of the TOD register/counter 26 after the next syncpoint, and further includes varius status bits. The transmission of the TOD register/counter value is chosen to be well away from the syncpoint transmission, so as to simplify its use at syncpoint with minimally complex control logic.

The encoded transmission from the other TOD clock source 12b is received by TOD source 12a on line 48 and is applied to decoder/receiver 34, where it is decoded into a reference frequency, syncpoint, and data. The data is stored in an appropriate holding register 50 where it is available to the control logic for TOD source 12a.

The reference frequency signal output of decoder/receiver 48 is applied via line 52 to one input of a phase comparator 38. Similarly, the reference frequency signal output from divider 30 on line 54 is applied to the other input of phase comparator 38, after it has received a phase adjustment in phase adjuster 36. The phase adjustment is necessary to compensate for the phase shift resulting from transmission propagation delays. Phase comparator 38 compares the phases of the two input signals and provides an output signal on line 56 which is the representative of the phase error therebetween. A suitable method for performing this phase comparison utilizes a simple exclusive-OR gate with averaging and filtering of its output.

The phase error signal on line 56 is processed utilizing first order lag dynamics with steady state gain K, as is implemented by filter 40. The output signal from filter 40 appearing on line 58 is applied to VCO 28, and operates to change its frequency in a direction to cause the phase error signal to approach zero.

The TOD source 12a includes error detection circuits 42 which monitor the phase error between the incoming reference frequency signal on line 48 and the outgoing signal on line 46 and determines when phase lock is obtained, or when it is lost. The error detection circuits also function to detect other simple failures such as power out of regulation and complete loss of the input signal. The circuits 42 further provide consistency checks such as the correct number of cycles between syncpoints. These conditions operate to set various status flags which are included in the data being transmitted from a TOD clock source.

Since the phase of a signal is the integral of its frequency, and the system applies a first order filter to phase differences, it follows from classical control theory that the system as a whole is a second order system. For the whole fault-tolerant system to be stable under all failure modes, it is necessary that the parameters of the first order filter be chosen such that the second order system is overdamped. It should be noted that in steady state operation each of the TOD clock sources 12a and 12b of the duplex system will perceive a steady state phase error which is required to deflect that TOD source's intrinsic operating frequency to the steady state operating frequency. If the propagation delay phase compensation is perfect, this operating frequency will be the average of the two intrinsic operating frequencies. If the propagation delay phase compensation is imperfect, the operating frequency will also be partially determined by the magnitude of this error and the steady state gain K. In any case the steady state result will be such that the TOD clock sources 12a and 12b are operating at exactly the same frequency but with some steady state phase error or skew between them. The maximum magnitude of this phase error can be computed as a function of implementation parameters; and the reference frequency should be such that this maximum steady state phase error is no more than 30 to 45 degrees of the reference frequency. It must be smaller than the performance boundary of the phase comparator being employed and should additionally include, engineering margins. The most commonly and economically implemented phase comparators operate over $+/-90$ degrees, but $+/-180$ degree comparators are also easily implemented and are within the state of the art.

During initialization, and after frequency lock has been achieved between the two TOD clock sources 12a and 12b, the TOD clocks and syncpoint can be aligned by having one of the TOD clock sources accept the TOD value and MuS syncpoint from the other clock source. On cold start, the TOD value could be entered from either TOD clock source through a manual operation or from an external frequency reference standard, and the alternate TOD clock source could simply accept this value. When one of the TOD clock sources is restarting, such as after repair or power interruption, it would accept the TOD value and syncpoint from the operating TOD source. It should be noted that under normal operating conditions, the two TOD clock sources 12a and 12b will maintain alignment with each other without adjustments of either the TOD value of the MuS syncpoint. Therefore, a disagreement between the clock sources is an indication of failure. A clock source should not attempt to realign itself with the other source, except in those cases where it has a positive indication of an internal fault such as a power on reset. It is therefore advantageous that discreet data should be transmitted as part of the data stream between the two TOD clock sources, to indicate whether a source believes that it is maintaining frequency lock, restarting, or other situation and whether it believes that its TOD value and syncpoint are valid. To accept the syncpoint and TOD value from the other side the accepting side must first establish reference frequency phase lock. Once this is done, the control logic 42 inhibits TOD counter 26 via line 27, clearing those bits of the TOD counter 26 to zero below the syncpoint (bits 32 through 63 in the embodiment). Then the control logic 42 waits until data register 50 has received the transmitted TOD value from decoder/receiver 34 for the higher order bits of the TOD counter and loads these via line 29 into the TOD counter above the syncpoint (bits 0 through 31 in the embodiment). The control logic 42 then waits until it receives the next syncpoint signal and reenables the TOD register/counter via line 27 at that syncpoint. At this time, the TOD register/counters are aligned to the skew accuracy of the reference signal.

Figure 3:
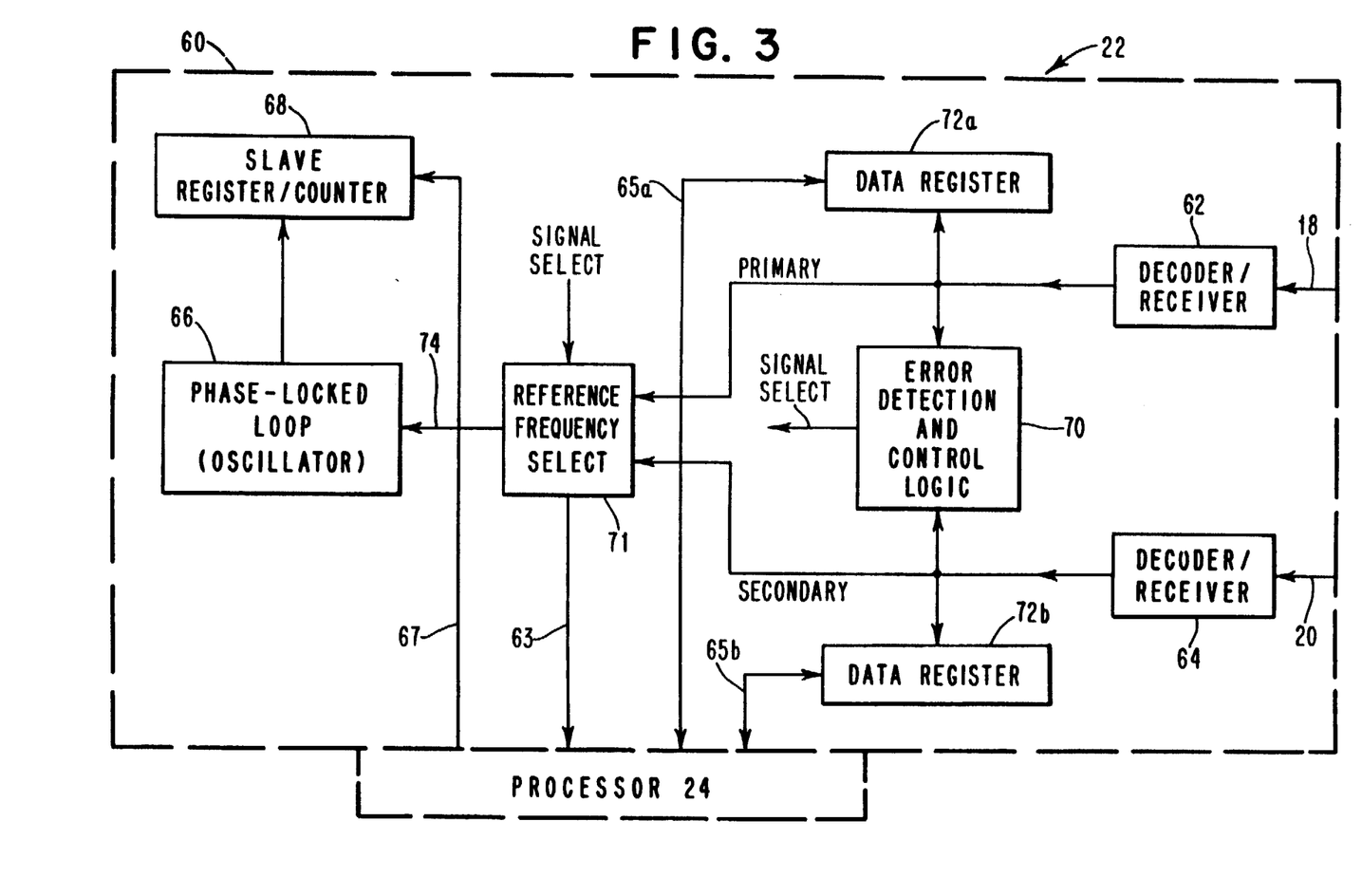
FIG. 3 depicts the TOD slave receiver circuit organization for the dual redundant clock implementation.

With reference to FIG. 3, there are illustrated the circuit elements which comprise the receiver 60 of the TOD slave 22 for the dual redundant broadcast clock embodiment. Such elements include the decoder/receiver units 62 and 64 for the pair of broadcast signals transmitted respectively by the TOD clock sources 12a and 12b. A phase-locked loop with its associated oscillator 66 is provided for driving a slave TOD register/counter 68. Also included in the receiver circuit organization are appropriate error detection and control logic circuits 70.

In operation, the reference frequency signals from the TOD clock sources 12a and 12b are received on lines 18 and 20 and are decoded by decoder/receivers 62 and 64 into signals representative of a reference frequency, syncpoint event and data. The data is held in registers 72a and 72b for use by the control logic circuits 70.

Either the reference frequency derived from TOD clock source 12a or clock source 12b is used to drive the TOD slave's phase-locked loop 66 which is coupled to the slave TOD register/counter 68 and increments the latter. The TOD clock source which provides the selected reference signal is referred to as the "primary"; the other clock source, "secondary". It should be noted that the reference frequency on line 74 is too low to directly drive the slave TOD register/counter 68, and thus the slave phase-locked loop 66 is required to frequency multiply the reference frequency to the desired level to obtain the necessary TOD register/counter resolution, in the same fashion as described for the TOD clock source.

The error detection circuits 70 are utilized to detect obvious failures of either incoming signal on lines 18 or 20, and are effective in switching the TOD slave 22 via select unit 71 to the secondary source when a failure of the primary is observed. Moreover, when the error detection circuits 70 are unable to maintain frequency and phase lock with a signal from either TOD clock source or both signals indicate a failed condition, they post a synchronization exception to the processor. The error detection circuits provide as a minimum, detection for complete loss of a signal from a clock source, phase or syncpoint misalignment either between the primary or secondary TOD clock sources and the TOD slave, phase or syncpoint misalignment between the TOD clock sources, and disagreement between the TOD clock sources and/or the slave TOD values.

FIG. 4 illustrates, by way of example, the failure of the reference frequency signal of clock source 12a at point "A", and the transfer of TOD slave 22 to the "nearest" reference frequency pulse at point "B", generated within clock source 12b. As noted hereinbefore, the skew between the reference frequency pulses generated respectively within clock sources 12a and 12b must be small relative to the period of the reference frequency. Stated another way, as seen in FIG. 4, the magnitude of the reference frequency is chosen to be low enough that adjacent reference frequency pulses occur relatively far apart. Accordingly, the transfer of the TOD slave 22 from clock source 12a to source 12b is achieved without any ambiguity as to the pulse from source 12b which is to be accepted by the slave. The next pulse from source 12b at point "B" occurring after the failure of source 12a at point "A" is the "correct" pulse from the standpoint of synchronization. The incrementation of the TOD slave register/counter 68 by the high frequency internal clock pulses is unaffected by the transfer from one clock source to the other. That is, none of the high frequency internal clock pulses applied to the register/counter 68 are lost in the transfer process.

On the other hand, if the period of the reference frequency had been smaller than the skew between sources 12a and 12b, then failure at some point of the pulses from source 12a, would cause slave 22 to pick up the next available pulse from source 12b, even though the "correct" pulse is further downstream-displaced in accordance with the inherent skew. While the skew is initially apparent from an examination of adjacent syncpoint signals (MuS) from the respective pair of clock sources, such a reference point is not apparent during operation and the TOD slave 22 is unable to determine which reference frequency pulse to access during transfer.

At start up, the TOD slave's clock and syncpoint can be aligned with one of the reference signals from TOD clock sources 12a or 12b by having it load the TOD bits 0:31, and inhibiting its own internal TOD register/counter 68 incrementation until the syncpoint signal is received. In the proposed embodiment for an IBM system 370 this synchronization process is controlled by the SETCLOCK instruction from the processor 24. Thus, the processor receives a signal on line 63 from select unit 71 to read via line 65a or 65b, the received TOD value from either data register 72a or 72b, containing data derived from the selected reference frequency carrier. The processor 24 then loads the data into the TOD slave register/counter 68 via line 67 with a SETCLOCK instruction. This instruction loads the TOD and inhibits the register/counter until a synchronization signal occurs. This signal is provided by the syncpoint signal.

The alignment procedure should only be executed once during processor initialization, and only in conjunction with the above mentioned programming instruction of the processor. Once alignment is achieved, then a disagreement between the slave's TOD value syncpoint and the transmitted reference signals is an indication of a fault. If the slave's internal TOD value syncpoint differs from the primary TOD clock source reference frequency but agrees with the secondary, then the primary has failed and the slave must switch to the secondary reference. If both reference frequencies from the primary and secondary agree, but the slave's clock disagrees, then the slave's TOD clock should be assumed to have failed, and a synchronization exception must be raised in the processor.

The TOD slave 22 may switch back and forth from the primary clock source to the secondary source without interfering with the integrity and alignment of its own TOD value. If necessary, the switchover may require a phase alignment of the oscillator in the phase-locked loop 66 and this can be accomplished without disturbing the slave's TOD value. When both of the TOD clock sources 12a and 12b are operating correctly, the TOD slave 22 may select either one as the primary. Once selected, the slave may always return to this primary source, for example, after it has been taken out of service for a failure and is subsequently restored. It should be observed that the ability to easily switch from one source to the other requires that the sources have only small skews with respect to one another and the reference frequency.

As noted hereinbefore, the error detection circuits 70 are necessary to detect failures in the reference frequency signals from the TOD clock sources. Such circuits may be implemented for example, by a simple monitor responsive to the power for the TOD sources. Thus, a power failure could be used to inhibit transmission of the reference clock frequency from the associated TOD clock source. A total failure of the oscillator in a clock source should have the same results. Other failures may also be easily detected, such an incorrect number of reference cycles between sync signals. Although many different failures may be detected and are generally tolerated by the duplex system, there are certain deficiencies in the system which cannot be detected. For example, if the oscillator frequency is "nearly correct", or the two TOD clock sources 12a and 12b unlock from each other, these failures cannot be readily diagnosed by the TOD slave receiver circuits, and they may in fact cause a system synchronization failure. These "undetectable" faults can be caused for example, by component failures in the oscillator circuits or the phase-locked loop of a TOD source. Again, failures of this class can be assumed to lead to prompt loss of synchronization in the system. Notwithstanding the latter difficulty, it must be recognized that the duplex system provides acceptable fault coverage for most applications.

A solution to the inherent detection and fault isolation problems of a purely dual system requires additional frequency standards. Theory dictates $3f+1$ frequency sources to tolerate all single point failures. A quad implementation is therefore required to tolerate all single point failures. Conveniently, a quad implementation can be constructed which remedies the uncovered fault modes mentioned above, and which is compatible with the described duplex distribution scheme. Such a quad configuration is partitioned and packaged in two pieces creating a dual partition quad architecture. Such a system is illustrated in FIG. 5.

Figure 5:
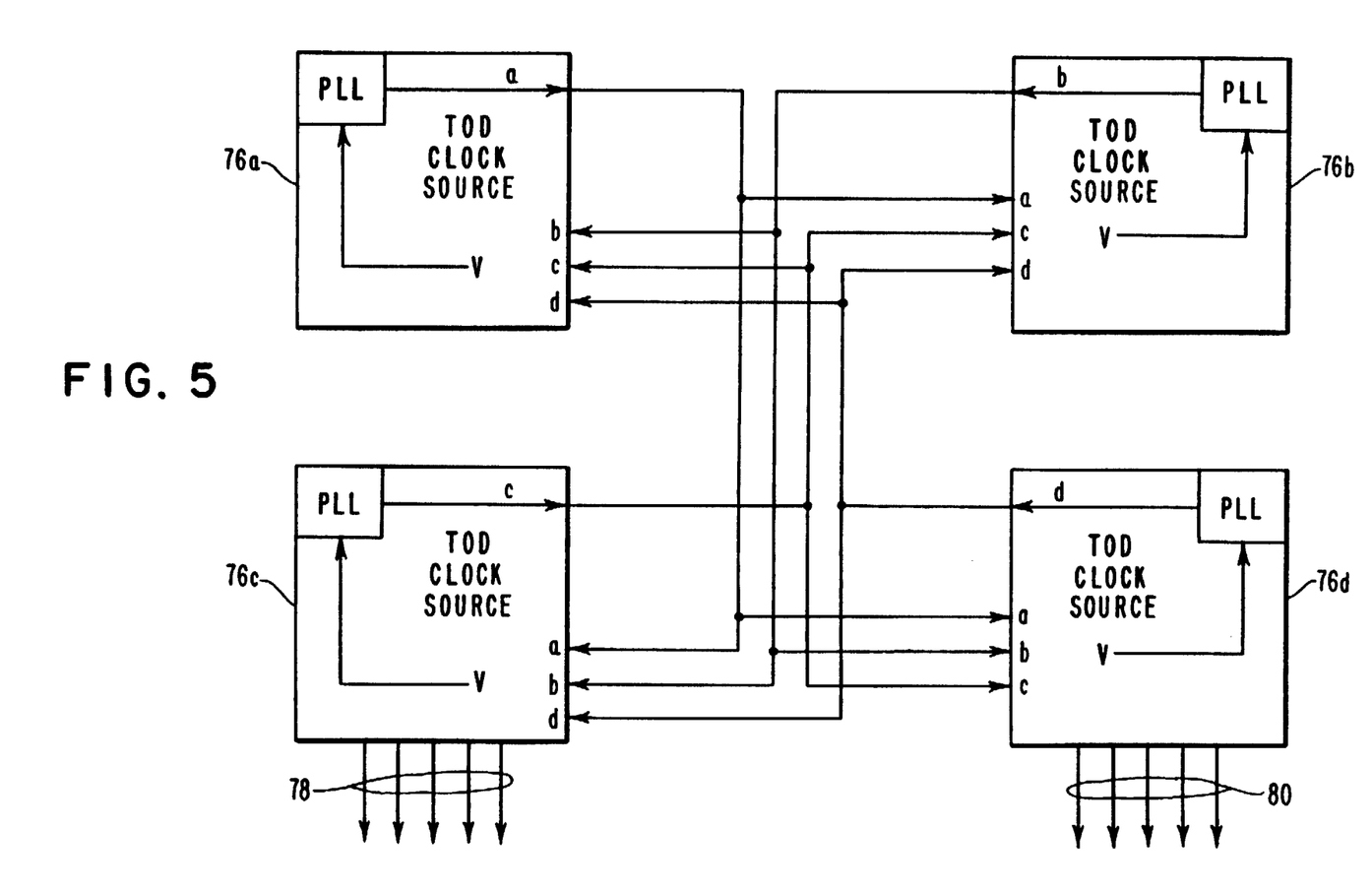
FIG. 5 is a block diagram of a quad TOD synchronization system implementation, which is compatible with the duplex reference frequency distribution mode of FIG. 1.

FIG. 5 depicts four TOD clock sources 76a, 76b, 76c and 76d which are substantially the same as clock source 12a or 12b illustrated in FIG. 2. Each of the clock sources has a phase-locked loop (PLL). Clock sources 76a, 76b, 76c and 76d transmit respectively reference signals a, b, c and d to each of the other three sources. Each TOD clock source then votes (V) the received three signals and attempts to phase lock to the voted reference signal. Such a system is immune to all single point failures. Any two of the TOD clock sources can then be used to transmit dual reference signals 78 and 80 to the TOD slave 22 as in the case of the duplex system. For compatibility with the dual philosophy described hereinbefore, clock sources 76c and 76d may be chosen as primary and secondary sources. Comparison circuits internal to a TOD clock source can easily detect the loss of phase lock by the transmitting source and can provide a failure indication which is easily detected by the TOD slave receiver 60. This detection forces the slave 22 to switch to the secondary source quickly enough to avoid breaking phase lock. It is apparent that except for the elimination of the so called "near correct frequency" failure modes of the purely dual structure of FIG. 1, the quad architecture of FIG. 5 has similar operational characteristics to the duplex structure.

Figure 6:
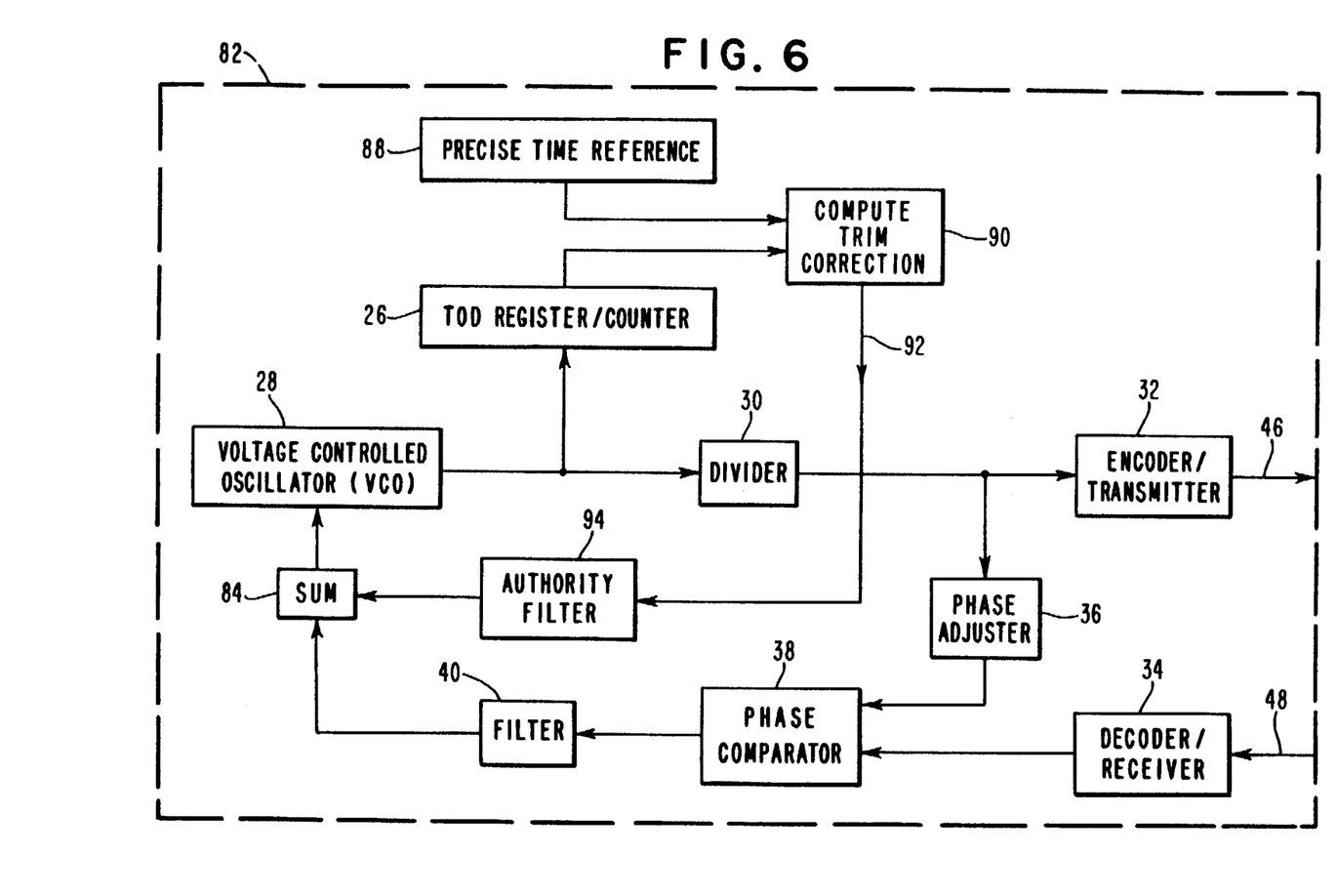
FIG. 6 illustrates a mechanism for frequency steering an element of either the dual or quad implementations of FIGS. 1 and 5 respectively.

Actual operative embodiments of the duplex and quad structures have produced synchronized TOD clocks which are accurate to approximately one second per day. This degree of accuracy is entirely suitable for many situations. However, applications exist in which better conformity to real time is desirable or even required. The present invention contemplates this increased accuracy as being best achieved by employing frequency steering with the TOD clock sources. FIG. 6 illustrates a mechanism for frequency steering a TOD clock source 82 of either the dual or quad configurations.

A comparison of FIG. 6 with the internal organization of the TOD clock source of FIG. 2, reveals the presence of the additional elements. A summing circuit 84 is interposed between the filter 40 and oscillator 28. The output of the summing circuit 84 on line 86 is applied to the VCO 28 and controls the output frequency thereof. The TOD clock value is stored in the TOD register/counter 26. A precise time reference 88 is utilized. The signals from the TOD register/counter 26 and the precise time reference 88 are applied to a compute trim correction circuit 90 where they are compared. Deviations in the frequencies of the compared signals cause the trim correction circuit 90 to generate a steering signal on line 92. This signal is applied to an authority filter 94, the function of which is to limit the magnitude of the trim adjustment provided by the steering signal so that it is not so great as to force a break in phase lock among the synchronized components of the system. The output of the authority filter 94 is summed with the processed error signal from filter 40 in summing circuit 84. Depending upon the nature of the steering signal, that is whether the reference frequency time is observed to be fast or slow, the output of the summing circuit 84 will cause the VCO output frequency to be deflected downward or upward. The remaining elements of TOD clock source 82 function in the same manner as the like-named numbered of FIG. 2.

It should be noted that in the frequency steering scheme of FIG. 6, the integrity of synchronization is uncoupled from the accuracy of the TOD clock. The steering mechanism need not be continuous since the normal synchronizaton of the TOD clock source 82 can be adequately maintained for long periods of time without diverging from real time significantly. Accordingly the precise time reference does not need to be continuously available. A radio based frequency standard such as WWV could be utilized intermittently, or alternately the precise frequency reference 88 may simply be a fixed frequency oscillator with manual corrections to the time when significant deviations are noted.

Actual operative embodiments of both the dual and quad configurations have been constructed using VDO's single chip controllers and discreet phase measurement circuits. The controller chips were used to digitally implement the necessary phase voting and filtering. Additional circuits consist of simple dividers, counters and control circuits. The voting circuit used in the quad implementation may be provided by a majority logic. Both the TOD clock sources and the receiver of the TOD slaves may be mechanized with other circuit elements well known to the electronic circuit designer.

It should be noted that the value of the reference frequency has a significant effect on the encode/transmitter and decode-receiver logic as well as the nature of the distribution of the reference signals. For example, if synchronization requirements dictate skews of less than one microsecond, then a reference frequency near 10 to 100 KHz. is appropriate. Twisted wire distribution of such a low frequency is adequate for star topologies, and coaxial or twinax may be used for buses. On the other hand, skews of less than one microsecond will require more judicious management of cable lengths, as cable propagation delays are significant relative to this skew requirement. If the application allows 10 or 20 microsecond skews, then the reference frequency below 1 KHz. and twisted pairs with only coarse management of cable length will be adequate.

In conclusion, there has been disclosed an economical and effective means for providing fault-tolerant hardware synchronized operation of the separate clocks of a multiprocessor system. While particular circuit parameters have been mentioned relative to the synchronization implementations, it should be understood that such information has been presented solely for purpose of example.

What is claimed is:

1. A fault-tolerant synchronization system for TOD clocks in a multiprocessor complex comprising:
    at least a pair of time of day (TOD) clock sources, each of said clock sources including;
    means for generating an internal clock signal having a nominal frequency,
    TOD register/counter means for holding a data value and being responsive to said internal clock signal for incrementing the data value held thereby at a rate determined by said internal clock signal and including frequency divider means responsive to the internal clock signal for providing a periodic reference signal having a selected period, wherein the data value held by said register/counter represents a TOD clock value,
    means coupled to said register/counter means for transmitting said reference signal to the other of said TOD clock sources,
    means for receiving said reference signal from said other of said clock sources, and
    means, responsive to said received reference signal for synchronization said clock source to the other of said clock sources, to within a predetermined skew, wherein the period of said reference signal is selected to be greater than said predetermined skew.

2. A fault-tolerant synchronization system as defined in claim 1 wherein the means for synchronizing said clock source to the other of said clock sources includes:
    means in each of said TOD clock sources for comparing the respective phases of the transmitted and received reference signals and for generating an error signal having a value proportional to any phase misalignment represented by a difference between the respective transmitted and received reference signals, and
    means for applying said error signal to said generating means to change the frequency of the internal clock signal and of the reference signal derived therefrom in a sense which tends to cause said error signal to approach zero.

3. A fault-tolerant synchronization system as defined in claim 2 further characterized in that the nominal frequency of said internal clock signal is chosen to realize a preselected resolution of the TOD clock value stored in said register/counter; wherein said preselected resolution is less than said skew.

4. A fault-tolerant synchronization system as defined in claim 1 further including;
    a plurality of TOD slave clock signal generators associated respectively with the processors of said multiprocessor complex, means coupled to said pair of TOD clock sources for transmitting said respective reference signals to each of said TOD slave clock signal generators, each of said TOD slave clock signal generators having a pair of decoder/receivers for receiving respectively said reference frequency signals from said pair of TOD clock sources, means for selecting the reference signal provided by one of said pair of TOD clock sources, and means responsive to the selected reference signal for providing a TOD clock value for use by the processor associated with the TOD slave clock signal generator.

5. A fault-tolerant synchronization system as defined in claim 4 wherein:

said means for transmitting said reference signal in each of said pair of TOD clock sources includes means for transmitting a value, provided by the register counter means, representing the TOD clock value to each of said TOD slave clock signal generators, and said pair of TOD slave clock signal generators are ordinarily numbered first and second, said first and second TOD slave clock signal generators including first and second data registers coupled respectively to the decoder/receivers of said first and second TOD slave clock signal generators for storing the value representing the TOD value transmitted by the selected one of said pair of TOD clock sources.

6. A fault-tolerant synchronization system as defined in claim 5 wherein said means for providing a TOD clock value for use by its associated processor includes:

an oscillator disposed in a phase-locked loop, and slave TOD register/counter means coupled to said oscillator for holding a value representing said TOD clock value, said oscillator incrementing the value held by said slave TOD register/counter means at a predetermined rate, wherein said signal select means is coupled to said oscillator to drive said oscillator with said selected one of said pair of reference signals transmitted by said pair of TOD clock sources to said decoder/receiver of each of said TOD slave clock signal generators.

7. A fault-tolerant synchronization system as defined in claim 6 characterized in that the processor associated with a given one of said TOD slave clock generators effects initialization of the TOD register/counter means of the one TOD slave clock generator with the received TOD value stored in the data register corresponding to the selected reference signal, said processor reading said received TOD value into said TOD register/counter means of said one TOD slave clock generator and inhibiting the incrementation of the value held thereby until the occurrence of a syncpoint signal from the TOD clock signal generator corresponding to said selected reference signal.

8. A fault-tolerant synchronization system as defined in claim 4 characterized in that said means for selecting one of said reference signals includes, error detection means operatively coupled to both of said reference signals for detecting inconsistent and erroneous states of said reference signals, and signal select means coupled to said error detection means and responsive thereto for selectively coupling said means for providing said TOD clock, to one of said reference signals, wherein the detection of a failure in the reference signal coupled to one of said TOD slave clock signal generators at any given time by said error detection means causes said signal select means to switch said means for providing said TOD clock to the other of said reference signals, thereby preventing loss of synchronization in said multiprocessor complex.

9. A clock signal synchronization system including frequency steering means comprising:

precise time reference means, for producing a precise oscillatory signal, first and second clock signal generating means for generating respective first and second clock signals, said first and second clock signal generating means including means coupled to said second and first clock signal generating means, respectively, for changing the respective first and second clock signals in phase in response to respective changes in phase of the respective second and first clock signals to maintain mutual phase coherence between the respective first and second clock signals provided thereby, and clock signal adjusting means, coupled to said precise oscillatory signal and to one of said first and second clock signal generating means, for adjusting the clock signal provided thereby to be in substantial phase coherence with said precise oscillatory signal, using a magnitude limited control signal, without disturbing the phase coherence between said first and second clock signals.

10. A clock signal synchronization system as defined in claim 9 wherein:

each of said first and second clock signal generating means includes means for generating an internal phase error signal representing a difference in phase between the respective first and second clock signals, the respective phase error signals of said first and second clock signal generating means being internally coupled to said first and second clock signal generating means, respectively, to maintain mutual phase coherence between the respective first and second clock signals, and said clock signal adjusting means includes:

compute trim correction means having a pair of input terminals and an output terminal, means for coupling said precise oscillatory signal and clock signal provided by the one of said first and second clock generating means to said pair of input terminals of said compute trim correction means, said compute trim correction means comparing the signals coupled to its input terminals and generating a steering signal on its output terminal proportional to the difference in the relative phases of said signals coupled to its input terminals, sum means having a pair of input terminals and an output terminal, and authority filter means interposed between the output terminal of said compute trim correction means and one of said pair of input terminals of said sum means, said authority filter means limiting said steering signal in magnitude so as to preclude a break in the phase coherence between said first and second clock signals, wherein the internal phase error signal from the one of said first and second TOD clock sources is applied to the other input terminal of said sum means, and the output terminal of said sum means is coupled to the one of said first and second clock signal generating means to adjust the frequency of the clock signal provided thereby to tend to conform in frequency to the precise oscillatory signal.

11. A fault-tolerant synchronization system for time of day (TOD) clocks in a multiprocessor complex comprising:

first and second pairs of TOD clock sources disposed in a quad configuration which is substantially immune to all single point failures, each of said TOD clock sources including, means disposed in a phase-locked loop for generating an internal clock signal having a predetermined frequency, TOD register/counter means for holding a data value and being responsive to said internal clock signal for incrementing the data value held thereby at a rate determined by said internal clock signal and including frequency divider means responsive to the internal clock signal for providing a periodic reference signal having a selected period, wherein said data value held by said register/counter represents a TOD clock value, means coupled to said register/counter means for transmitting said reference signal to each of the other three TOD clock sources, and means for receiving reference signals respectively from said other three clock sources, means for applying the received reference signals to said generating means whereby the respective phases of said received reference signals are compared with the phase of said transmitted reference signal to generate three respective phase difference signals, voting means for selecting one of the three phase difference signals, and means for applying said selected phase difference signal to said generating means to bring said transmitted reference signal substantially into alignment with said transmitted reference signal.

12. A fault-tolerant synchronization system as defined in claim 11 including:

a plurality of TOD slave clock signal generators associated respectively with the processors of said multiprocessor complex, a selected pair of said first and second pairs of TOD clock sources transmitting respective reference signals to each of said TOD slave clock signal generators, each of the TOD slave clock signal generators including means for receiving the reference signals from said selected pair of TOD clock sources and means for selecting one of said received reference signals, and each of the TOD slave clock signal generators further including means responsive to the selected reference signal for providing a TOD clock signal for use by its associated processor.

13. A fault-tolerant synchronization system as defined in claim 12 characterized in that said means for selecting one of said reference signals includes, error detection means operatively coupled to both of said reference signals from said selected pair of TOD clock sources for determining the status thereof, and signal select means coupled to said error detection means and responsive thereto for selectively coupling said means for providing said TOD clock to one of said reference signals, wherein the detection of a failure in the reference signal coupled to a TOD slave at any given time by said error detection means causes said signal select means to switch said means for providing said TOD clock to the other of said reference signals, thereby preventing loss of synchronization in said multiprocessor complex.

14. A fault-tolerant synchronization system for TOD clocks in a multiprocessor complex comprising:

at least a pair of time of day (TOD) clock sources, each of said clock sources including;

means for generating an internal clock signal having a nominal frequency,

TOD register/counter means for holding a data value and being responsive to said internal clock signal for incrementing the data value held thereby at a rate determined by said internal clock signal and including frequency divider means responsive to the internal clock signal for providing a periodic reference signal having a selected period, wherein the data value held by said register/counter represents a TOD clock value, means for generating a syncpoint signal indicating an instant in time at which a synchronization event is to occur, means coupled to said register/counter means for transmitting said reference signal, said syncpoint signal and a value representing the TOD clock value to the other of said TOD clock sources, means for receiving said reference signal from said other of said clock sources, and means, responsive to said received reference signal for synchronizing said clock source to the other of said clock sources, to within a predetermined skew, wherein the period of said reference signal is selected to be greater than said predetermined skew.

15. A fault-tolerant synchronization system as defined in claim 14 wherein:

said means for transmitting said reference signal, said syncpoint signal and the value representing said TOD clock value includes encoder/transmitter means for modulating an oscillatory signal to obtain a signal conveying said reference signal, the value representing said TOD clock value and said syncpoint signal, and said means for receiving said reference signal, said syncpoint signal and the value representing said TOD clock value includes:

decoder/receiver means for demodulating the modulated oscillatory signal provided by said encoder/transmitter means, and a holding register coupled to said decoder/receiver means for storing said received TOD clock value.

16. A fault-tolerant synchronization system as defined in claim 15 wherein:

said pair of TOD clock sources are ordinarily numbered first and second, and said fault-tolerant synchronization system further includes first and second control logic means coupled to the respective register/counter means in each of said first and second TOD clock sources for effecting the initialization thereof, the TOD values transmitted by said first and second TOD clock sources represent TOD clock values at the next occurrence of the syncpoint signal, and said first control logic means includes means for changing the value held in said first register/counter means to be said received TOD clock value and means for holding said received TOD clock value in said first register/counter means by inhibiting the incrementing of the value held by said first register/counter means until the syncpoint signal is received from the second TOD clock source.

17. A fault-tolerant synchronization system as defined in claim 16 wherein the respective TOD clock value data held by the respective register/counters of said first and second TOD clock sources are facsimiles of a standard format TOD clock value utilized by the processors in said multiprocessor complex.

18. A fault-tolerant synchronization system as defined in claim 17 characterized in that said generating means comprises a voltage controlled oscillator disposed in a phase-locked loop.

19. A fault-tolerant synchronization system as defined in claim 18 further including error detection means for monitoring the transmitted and received reference signals in one of said first and second TOD clock sources to detect inconsistent and erroneous states of said transmitted and received reference signals.

20. A fault-tolerant synchronization system as defined in claim 19 wherein:

said error detection means further includes means for providing various status flags representing the states of the transmitted and received reference frequency signals, and said encoder/transmitter means includes means for encoding and transmitting said flags with the syncpoint signal and the value representing said TOD clock value from said one of said first and second TOD clock sources.

21. Apparatus for synchronizing two TOD clocks of predetermined clock resolution when the maximum skew between said TOD clocks is greater than said clock resolution, comprising:

means responsive to one of said TOD clocks for generating a periodic reference signal synchronized with said one TOD clock, said reference signal having a period greater than said maximum skew;

means for transmitting said reference signal from said one TOD clock to the other of said TOD clocks; and means at said other TOD clock for receiving said reference signal and for phase locking said other TOD clock to said reference signal, whereby said two TOD clocks are synchronized with each other but offset from each other by said skew.

* * * * *